United States Patent
Wen et al.

(10) Patent No.: US 12,362,835 B2
(45) Date of Patent: Jul. 15, 2025

(54) METHOD AND APPARATUS OF AUTOMATIC BIAS CONTROL FOR INTENSITY MODULATED SILICON MODULATOR

(71) Applicants: Yangjing Wen, San Jose, CA (US); Hongbing Lei, San Jose, CA (US)

(72) Inventors: Yangjing Wen, San Jose, CA (US); Hongbing Lei, San Jose, CA (US)

(73) Assignee: O-NET (USA) Inc., San Jose, CA (US)

( * ) Notice: Subject to any disclaimer, the term of this patent is extended or adjusted under 35 U.S.C. 154(b) by 251 days.

(21) Appl. No.: 18/132,091

(22) Filed: Apr. 7, 2023

(65) Prior Publication Data

US 2024/0340087 A1 Oct. 10, 2024

(51) Int. Cl.
*H04B 10/50* (2013.01)
*G02F 1/01* (2006.01)
*G02F 1/21* (2006.01)

(52) U.S. Cl.
CPC ..... *H04B 10/50575* (2013.01); *G02F 1/0123* (2013.01); *G02F 1/212* (2021.01)

(58) Field of Classification Search
CPC .. H04B 10/50575; G02F 1/212; G02F 1/0123
USPC .......................................................... 398/198
See application file for complete search history.

(56) References Cited

U.S. PATENT DOCUMENTS

| | | | | |
|---|---|---|---|---|
| 9,158,137 | B1 * | 10/2015 | Abbas | H04B 10/54 |
| 10,742,324 | B1 * | 8/2020 | Padmaraju | H04B 10/541 |
| 11,888,526 | B2 * | 1/2024 | Murakami | G02F 1/0123 |
| 2001/0013428 | A1 * | 8/2001 | Brady | F16F 15/10 |
| | | | | 175/320 |
| 2004/0013428 | A1 * | 1/2004 | Nakajima | H04B 10/505 |
| | | | | 398/43 |
| 2019/0036610 | A1 * | 1/2019 | Rope | H01S 5/0687 |
| 2022/0224416 | A1 * | 7/2022 | Buma | H04B 10/516 |

FOREIGN PATENT DOCUMENTS

| | | | |
|---|---|---|---|
| CN | 105099569 B | * 12/2017 | |
| WO | WO-2013042284 A1 | * 3/2013 | H04B 10/516 |

OTHER PUBLICATIONS

Kawakami et al; Asymmetric dithering technique for bias condition monitoring in optical QPSK modulator; Mar. 2010; Electronics letters, vol. 46, No. 6; pp. 1-2. (Year: 2010).*

* cited by examiner

*Primary Examiner* — Amritbir K Sandhu
(74) *Attorney, Agent, or Firm* — PatentPC; Bao Tran (57) ABSTRACT

Systems and methods are disclosed to provide automatic bias control for intensity modulated silicon modulator by providing a laser light to a Mach-Zehnder modulator (MZM) and splitting the laser light into a first arm and a second arm, wherein light in the first arm experiences a phase section for data modulation and light in the second arm receives heat for bias control and a phase section for data modulation; providing a first output light of the MZM; providing a complementary output light a monitor photodetector (mPD); and applying an uneven spacing 3-level square wave as dither for automatic bias control of MZM which operates at quad point and phase tuning with a heater.

20 Claims, 7 Drawing Sheets

METHOD AND APPARATUS OF AUTOMATIC BIAS CONTROL FOR INTENSITY MODULATED SILICON MODULATOR

BACKGROUND

The present invention relates to automatic bias control for intensity modulated modulators.

In short reach or client-side optical communications, intensity modulation direct detection (IMDD) is a promising solution for delivering high-capacity data. IMDD is a commonly used technique in short reach or client-side optical communications. IMDD works by encoding information into the intensity of a light wave, which is then transmitted over an optical fiber. At the receiver end, the light is detected and converted back into an electrical signal. This technique is well-suited for short-reach communications, such as those used in data centers or local area networks, because it is cost-effective, easy to implement, and can support high-capacity data transmission rates.

IMDD provides less complexity and lower power consumption compared with the solution of coherent detection. In short reach applications ranging from hundreds of meters to ten kilometers, like SRn, DRn, FRn and LRn (where n is an integer like 4, 8 or 16, etc), 4 levels of pulse amplitude modulation (PAM4) has been selected as modulation format, through compromising the spectral efficiency and receiver sensitivity as well as tolerance to multiple path interference (MPI). Different kinds of transmitters, including direct modulated laser (DML), electro-absorption modulation laser (EML) and silicon modulator have been used. Among the above transmitters, silicon Mach-Zehnder modulator (MZM) is promising when co-packaged optics (CPO) is used.

Automatic Bias Control (ABC) is a technique used to optimize the performance of modulators, particularly MZMs by adjusting the DC bias voltage applied to the modulator. ABC is a closed-loop control system that automatically adjusts the bias voltage to ensure optimal MZM performance. ABC can be implemented using various control algorithms, such as proportional-integral-derivative (PID) control or adaptive algorithms that can learn and adapt to changes in the system over time.

ABC is an important part of optical transmitter, since operating away from desired locking point may degrade extinction ratio (ER), optical amplitude modulation (OMA) and MZM linearity, leading to worse receiver sensitivity and less tolerance to MPI. One ABC method for silicon MZM uses two monitor photodetectors (mPDs) together with two optical taps, with one located at the input and the other one located at the output of the MZM. The additional tap introduces higher optical insertion loss, and the additional mPD requires more electrical pads and power supply. Another possible scheme may use a tone pad/pin of driver to input dither which is then applied to modulator together with high-speed electrical data. This ABC scheme only needs one mPD for dither detection, but this additional tone pin makes driver design more complicated and needs more space for driver chip.

Previous method on automatic bias control for silicon MZM uses two mPDs, one before the MZM and the other after the MZM, which suffers from additional insertion loss. An ABC for $LiN_bO_3$ MZM may apply dither in sinusoidal waveform to the phase region for bias control of modulator, detects optical output with dither modulation using a single mPD, and generates error function for feedback, update and control the new bias voltage via detecting the second order harmonic of dither. This method works well for $LiN_bO_3$ MZM since its phase shift has linear relationship with dither amplitude. While for silicon MZM which uses heater for phase tuning, the phase shift of MZM has a linear relationship with electric power applied to the heater, and the heater power is proportional to the square of total heater current, which is the sum of a DC (direct current) current and a dither current. The square rule generates the inherent second order harmonic of dither when using sinusoidal waveform for dither; This inherent second order harmonic makes the algorithm, based on the detection of second order dither harmonic in mPD photocurrent, induce an offset between the locked point and the expected quadrature bias point; This offset varies with the bias current value, where lower bias current experiences larger offset away from the desired quadrature locking point.

Using two level square waveform as dither does not generate the inherent second order harmonic in heater power, since the square of total bias current consisting of a DC and a dither in two level square waveform still generates a DC level plus a dither with two level square waveform. But the scheme does not generate the second order harmonic either in the mPD photocurrent of MZM output, which makes the detection of second order harmonic dither not working.

SUMMARY

In one aspect, systems and methods are disclosed to provide automatic bias control for intensity modulated silicon modulator by providing a laser light to a Mach-Zehnder modulator (MZM) and splitting the laser light into a first arm and a second arm, wherein light in the first arm experiences a phase section for data modulation and light in the second arm receives heat for bias control and a phase section for data modulation; providing a first output light of the MZM; providing a complementary output light to a monitor photodetector (mPD); and applying an uneven spacing 3-level square wave as dither for automatic bias control of MZM which operates at quad point and generates (?) phase tuning with a heater.

In another aspect, a system to provide automatic bias control for intensity modulated silicon modulator, includes a Mach-Zehnder modulator (MZM) to receive light, the MZM including a splitter that splits light into a first arm and a second arm, wherein light in the first arm experiences a phase section for data modulation and light in the second arm experiences a heater for bias control and a phase section for data modulation; a coupler coupled to the first and second arm, the coupler having a first output light of the MZM, while a complementary output light is sent to a monitor photodetector; and a control circuit coupled to the mPD and generating a bias current to drive the heater based on direct current (DC) bias current and dither current.

In yet another aspect, automatic bias control of Mach-Zehnder modulator is disclosed which locks and tracks to a quadrature point of a transfer function and uses heaters for phase tuning. The active area of modulator can be silicon, III-V semiconductor, or other types of material that uses the thermal effect to tune the phase for bias control.

In a further aspect, a method to perform ABC of intensity modulated silicon MZM only requires a single mPD and does not need the tone pin/pad from driver. The method uses uneven spacing 3-level square wave as dither, where the uneven spacing between the 3 levels of square waveform is calculated according to a developed formula using the heater DC bias current. Then the uneven 3-level square wave dither is generated and combined with DC bias current, to obtain the total bias current, which is then applied to the heater. The square of total bias current consisting of a DC and a dither in uneven spacing 3-level square waveform, generates heater power consisting of a DC level plus a dither with even spacing 3-level square waveform. The heater power (then the phase shift of MZM) with even spacing 3-level square waveform has no inherent second order harmonic, but has the second order harmonic in the mPD photocurrent once the MZM bias is away from its quadrature point, which can be used to construct the error function and generate the required DC bias change for next step. Repeating the process will make the MZM locked and tracked to the quadrature point.

Implementations can include one or more of the following. The heater locks and tracks to a quadrature point of a transfer function and uses the heater for phase tuning. The mPD detects a photocurrent of the MZM output from a tap located in a signal output port or a complementary port. The photocurrent is processed to detect a second order harmonic of dither, which is then used to generate an error function and the error function is used generate a new DC bias current. The new DC bias current is updated and combined with an uneven spacing 3-level square wave dither, and is applied to the heater and repeats for a bias control system in the control circuit to converge and be locked to a quadrature point. The dither is an uneven spacing three-level square wave, which is represented by a unitless waveform function $d_I(u, t)$ with N periods (N a positive integer), and within a dither period $T_b$, $d_I(u, t)=u$ for the first quarter, $d_I(u, t)=0$, for the second quarter of period, $d_I(u, t)=-1$ for the third quarter of period, and $d_I(u, t)=0$ again for the fourth quarter of period. Here u is the uneven spacing factor which is a positive number in the range of (0, 1]. The dither period $T_b$ is the reciprocal of dither repetition frequency $f_d$, and can be set according to a heater modulation response bandwidth. When u=1, $d_I(u, t)=d_I(1, t)$, it becomes the even spacing 3-level square wave. The even spacing 3-level square wave comprises a waveform between sinusoidal wave and two-level square wave, and exhibits properties between sinusoidal wave and two-level square wave.

The heater is used to heat the second arm. The control circuit combines the dither with a DC bias current to generate total bias current and applies the total bias current to a heater to create an MZM phase shift. The uneven 3-level square wave comprises a waveform function $d_I(u, t)$ expressed as:

$$d_I(u, t) = \begin{cases} u & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases}$$

where n is an integer in the range of [0, N−1] and $T_b$ is the dither period.

The applied heater current generates a heater power, which consists of DC power and dither power. The unitless waveform of dither power, $d_P$ is defined as:

$$d_P(t) = d_I(1, t) = \begin{cases} 1 & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases}$$

Once the total bias current is generated and applied to the MZM heater, the heater will introduce a phase shift between the two arms of MZM, so modulate the light passing through the MZM. This dither modulation will be detected in the mPD photocurrent, which may be amplified by a TIA, and then is filtered by a low pass filter (LPF) and digitized with a data converter and represented by $V_{mPD,det}(t)$. $V_{mPD,det}(t)$ and wherein the output is used to construct an error function Err which is determined by detecting an average value of the second order harmonic of dither as:

$$Err = \frac{1}{NT_b} \int_0^{NT_b} d_I^2(1, t) V_{mPD,det}(t) dt.$$

The control circuit minimizes Err. The coupler coupled to the first and second arm of MZM, can be a 2×1 coupler. The 2×1 coupler combines lights from the two arms, and a tap is used to split light into the mPD, and remaining light becomes an output signal. The coupler can also be a 2×2 coupler. An optical attenuator is introduced between the 2×2 coupler and the mPD. The optical attenuator may be a variable optical attenuator with a PN junction, an optical tap where a portion of light is sent into the mPD, or a 1×M splitter can be used where one splitter output port is connected to the mPD.

The invented automatic bias control (ABC) of intensity modulated silicon Mach-Zehnder modulator offers several advantages which may include one or more of the following:

Requires only a single mPD and does not need the tone pin/pad from the driver, reducing complexity and cost of the overall system.

Uses an uneven spacing three-level square waveform as dither, which is calculated based on the heater DC bias current, and combined with DC bias current to obtain the total bias current applied to the heater, providing accurate and efficient bias control.

Generates heater power consisting of a DC level plus a dither with even spacing three-level square waveform, which has no inherent second-order harmonic, improving the performance of the system.

Uses the second-order harmonic in the mPD photocurrent to construct the error function and generate the required DC bias change for the next step, making the MZM locked and tracked to the quadrature point, providing stable and reliable operation.

The apparatus can be optionally equipped with an optical attenuator, which can improve signal-to-noise ratio and accuracy of the ABC algorithm.

The solution can be implemented using a 2×2 or 2×1 coupler to combine the two lights from the two arms of the MZM, providing flexibility in the design of the system.

The solution provides accurate, efficient, and reliable ABC of intensity modulated silicon MZM, with potential applications in short-reach or client-side optical communications.

The use of uneven spacing 3-level square wave as dither eliminates the inherent second order harmonic of dither in heater power, making the ABC algorithm, based on the detection of second order dither harmonic, working.

The system can suppress the nonlinearity of mPD responsivity.

Heater can be used for automatic bias control of silicon MZM with a single mPD. There is no need to use two mPDs, or no need to introduce the tone/dither pad from driver, which simplifies the driver chip design and save driver chip dimension.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DESCRIPTION

Figure 1:
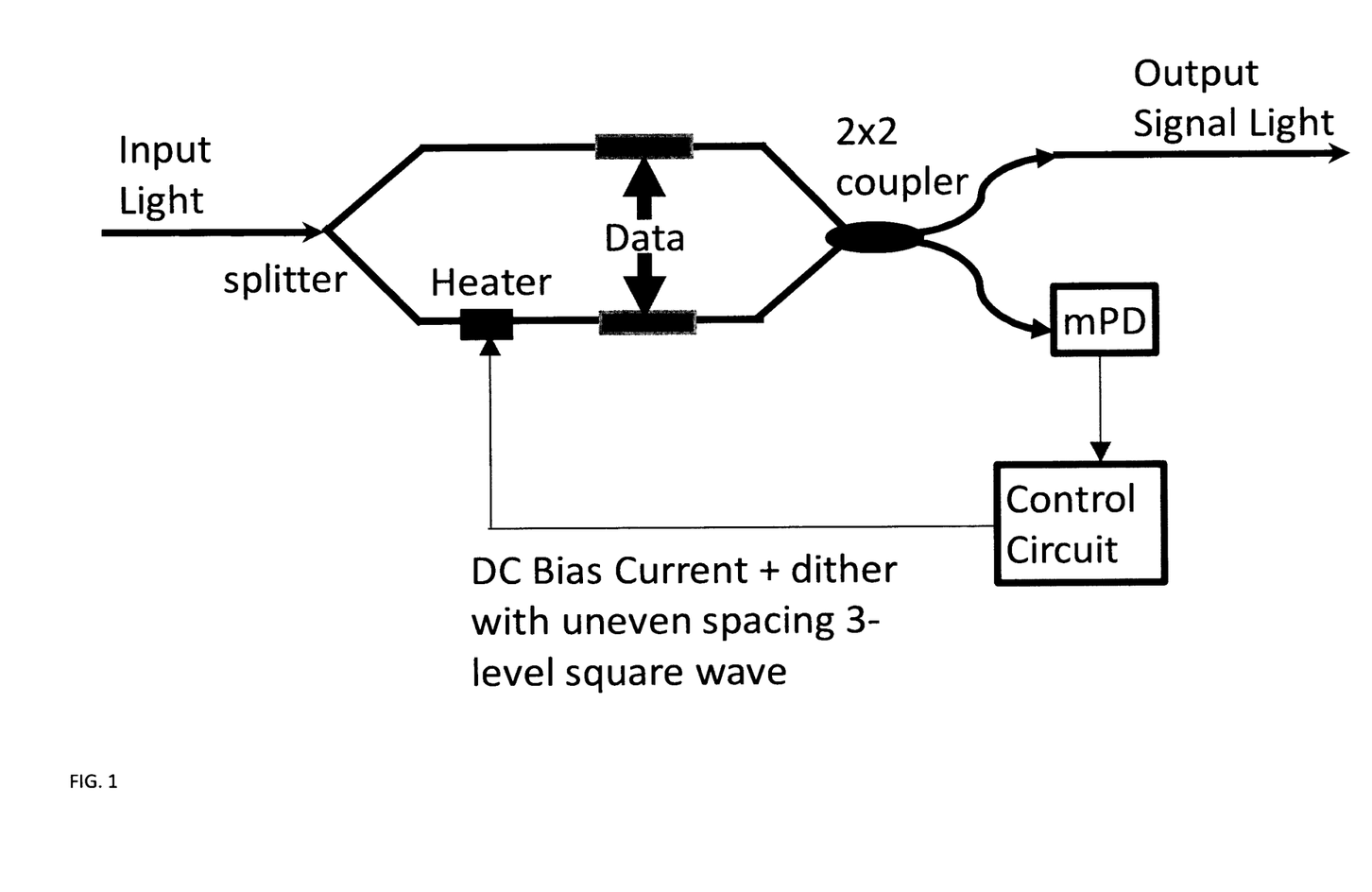
FIG. 1 shows an exemplary embodiment of an ABC for a silicon MZM.

FIG. 1 shows an exemplary embodiment of an ABC for a silicon MZM. FIG. 1 shows a configuration of ABC system for intensity modulated MZM which uses heaters for phase tuning. A light is launched into the input port of the MZM, which is then split into the two arms by a splitter. The light in the first (upper) arm experiences a phase section for high-speed data modulation, while the light in the second (lower) arm experiences a heater for bias control and another phase section for high-speed data modulation. The heater is driven by a DC bias current together with a dither current with uneven spacing 3-level square waveform. Then the two lights of the two arms are input into a 2×2 3 dB coupler, which may be a directional coupler or a multimode interferometer (MMI). One output of the coupler becomes the output signal light of the MZM, while the complementary output of the coupler is launched into a mPD which converts the received light into photocurrent. The detected photocurrent contains dither modulation. All the optical paths in the configuration can be based on waveguide, like silicon waveguide or InP waveguide. The mPD photocurrent may be first amplified by a transimpedance amplifier (TIA) and filtered by a low pass filter to suppress the noise, and is then sent to the control circuit for signal processing. An analog to digital convertor (ADC) may be used inside the control circuit to convert the analog signal to digital signal before signal processing.

Figure 2:
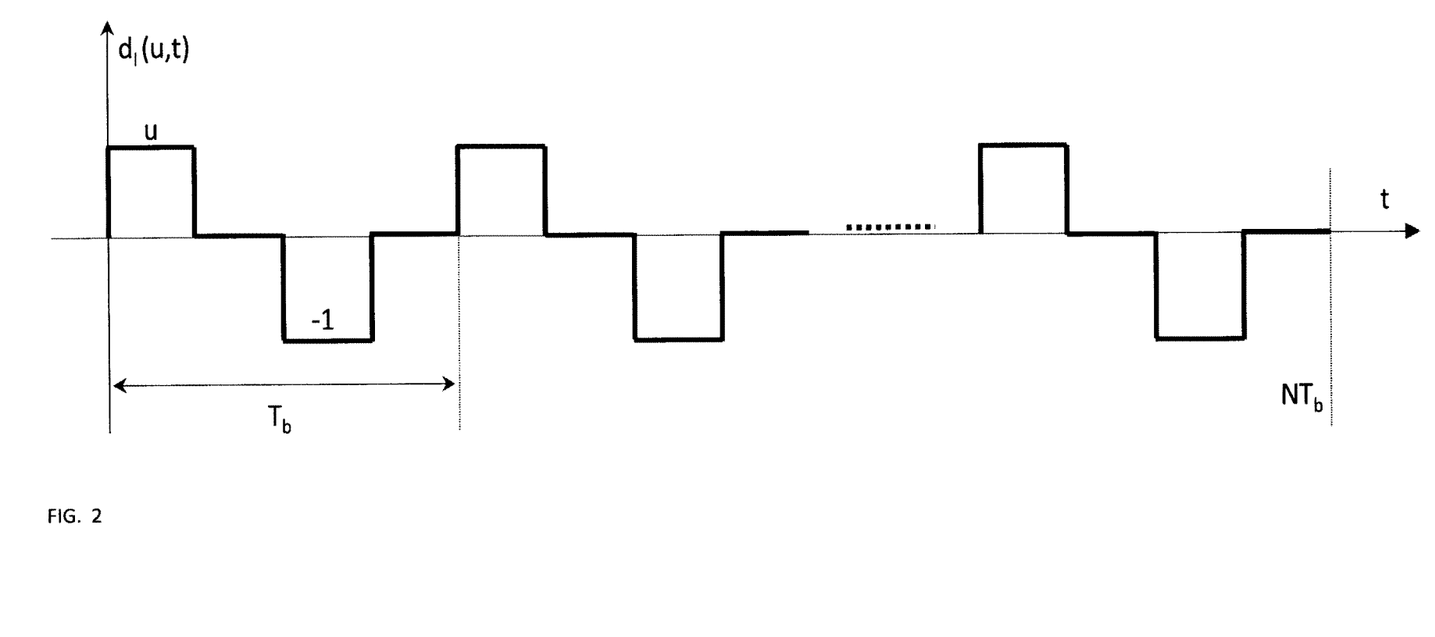
FIG. 2 shows an exemplary embodiment of uneven spacing 3-level square wave.

The ABC algorithm for quadrature locking is based on second order dither detection. The dither is an uneven spacing three-level square wave, which is represented by a unitless waveform function $d_I(u, t)$ with N periods (N is a positive integer), as shown in FIG. 2. Within a dither period $T_b$, $d_I(u, t) = u$ for the first quarter of period, $d_I(u, t) = 0$, for the second quarter of period, $d_I(u, t) = -1$ for the third quarter of period, and $d_I(u, t) = 0$ again for the fourth quarter of period. Here u is the uneven spacing factor which is a positive number in the range of (0, 1]. The dither period $T_b$ is the reciprocal of dither repetition frequency $f_d$, and can be set according to the heater modulation response bandwidth, and may be typically in microsecond scale. When u=1, $d_I(u, t) = d_I(1, t)$, the dither becomes even spacing 3-level square wave and is equivalent to a sinusoidal/cosine (with delay) wave quantized with 3 levels. When $d_I(u, t) = u$ for both quarter 1 and quarter 2, and $d_I(u, t) = -1$ for both quarter 3 and quarter 4, the 3-level square wave becomes a conventional 2-level square wave. The even spacing 3-level square wave is a waveform between sinusoidal wave and two-level square wave, so it is expected to exhibit properties between sinusoidal wave and two-level square wave.

FIG. 2 shows an exemplary embodiment of uneven spacing 3-level square wave, whose waveform function $d_I(u, t)$ can be expressed in formula as below:

$$d_I(u, t) = \begin{cases} u & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases} \quad (1)$$

where n is an integer in the range of [0, N−1].

The ABC algorithm is described next. For each control loop step with step index k, a DC bias current, $I_{DC,k}$ is generated and combined with dither current $I_m d_I(u, t)$ to get the total bias current, $$I_{b,k}(t) = I_{DC,k} + I_m d_I(u, t) \quad (2)$$

where $I_m$ is the modulation current amplitude. Assuming the heater resistance of $R_{htr}$, the heater power can be expressed as $$P_{htr}(t) = I_{b,k}^2(t) R_{htr} = (I_{DC,k} + I_m d_I(u, t))^2 R_{htr} \quad (3)$$

Here we set or calculate the uneven spacing factor u in Equ. (1) according to the following formula $$u = \left(\sqrt{2I_{DC,k}^2 - (I_{DC,k} - I_m)^2} - I_{DC,k}\right)/I_m \quad (4)$$

Insert Equs. (1) and (4) into Equ. (3), we can get the heater power $$P_{htr}(t) = P_{DC} + P_m d_P(t) \quad (5)$$

where $$P_{DC} = I_{DC,k}^2 R_{htr} \quad (6)$$

$$P_m = (2I_{DC,k} I_m - I_m^2) R_{htr} \quad (7)$$

$$d_P(t) = d_I(1, t) = \begin{cases} 1 & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases} \quad (8)$$

Equs (5-8) show the heater power consists of a DC power $P_{DC}$ and a dither power which is an even spacing 3-level square wave. It has no inherent second order harmonic of dither in the heater power, but can generate second order harmonic of dither in the mPD photocurrent when the MZM bias current is away from quadrature point, which can be used to construct the error function and obtain the new DC bias current for next step of bias control.

Once the total bias current is generated and applied to the MZM heater, the heater will introduce a phase shift between the two arms of MZM, so modulate the light passing through the MZM. This dither modulation will be detected in the mPD photocurrent, which may be amplified by a TIA. The TIA may be consisted of two-stage amplifications, where the first stage converts the photocurrent into a voltage source signal, which is then further amplified by the second stage. There may be a DC block between the two stages to remove DC component, in order to avoid the saturation. The output is then likely filtered by a low pass filter (LPF) and AD converted to digital signal, which is represented by $V_{mPD,det}(t)$. $V_{mPD,det}(t)$ is then used to construct the error function Err via detecting the average value of the second order harmonic of dither as below $$Err = \frac{1}{NT_b} \int_0^{NT_b} d_f^2(1, t) V_{mPD,det}(t) dt \quad (9)$$

$d_f^2(1, t)$ is a two-level square wave with a period of $T_d/2$ and a repetition frequency of $2f_d$. The error function is then used to calculate the new DC bias current for next step:

$$I_{DC,k+1} = I_{DC,k} + \rho \times Err \quad (10)$$

where $\rho$ is the loop control scaling factor, which is dependent on MZM input optical power, insertion loss, mPD responsivity, and gain of TIA, etc. The sign of $\rho$ determines if the locking is at $\pi/4$ quad or $3\pi/4$ quad of the MZM transfer function.

The updated $I_{DC,k+1}$ is then again combined with dither current and applied to the heater for next control step. The procedure is cyclically repeated over step by step, and is converged once Err is sufficiently small and stabilized which can be used as a convergence criteria.

For the first step k=1, $I_{DC,1}$ is the initial DC bias current, which can be set as a random number, at the middle of upper limit and lower limit of DC bias current, or close to the target current via initial rough scanning.

Figure 3:
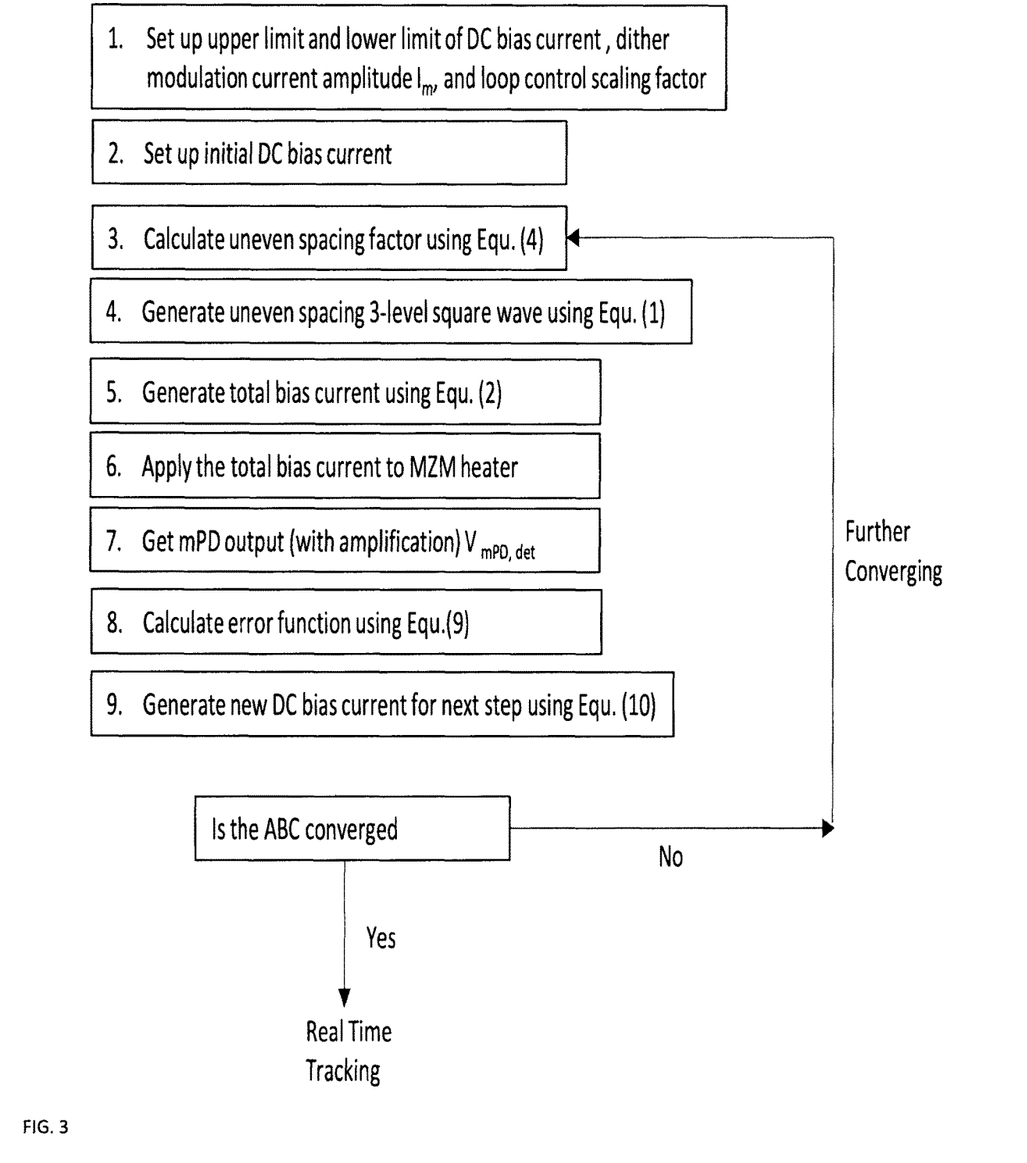
FIG. 3 shows an exemplary flow chart of a method for automatic bias control at quad of MZM which uses heater for phase tuning.

FIG. 3 shows an exemplary flow chart of a method for automatic bias control at quad of MZM which uses heater for phase tuning and operates at the quadrature point. First, the upper limit $I_{up}$ and lower limit $I_{low}$ of DC bias current are set, to provide an operation range of DC bias current. These numbers depend on the heater resistance and $P_{90}$ which is the required heater power to generate $\pi$ phase shift. An operation range of interest for DC bias current may be a value which provides a phase shift range of $2\pi$, so $I_{low}$ may be a current which provides $1\pi$ (or $0.5\pi$) phase shift, and $I_{up}$ may be a current which provides $3\pi$ (or $2.5\pi$) phase shift. Dither modulation current amplitude should be set in such a way that modulation index (the ratio of dither modulation current amplitude to DC bias current) is a few percent. The loop control scaling factor should be adjusted according to the MZM input power, insertion loss, tap ratio, mPD responsivity and TIA gain. It may be adaptively adjustable and may be smaller once the ABC is converged.

The initial DC bias current is then set up. In principle, it can be a random number within the range of $I_{up}$ and $I_{low}$. A useful or typical number of initial DC bias current could be the middle value of $I_{up}$ and $I_{low}$. To reduce the number of iterations for faster convergence, the DC current applied to heater can be first scanned to identify the rough bias current corresponding to the quad point via measuring the mPD photocurrent, then this bias value can be used as the initial DC bias current.

Step 3 calculates the uneven spacing factor u using Equ. (4) with the DC bias current, then u is used to generate the uneven spacing 3-level square wave using Equ. (1) which is then used to generate the dither current. Total bias current is generated by combining DC bias current and dither current, which is then applied to the MZM heater. The ABC then detects the mPD output, $V_{mPD,det}(t)$, after it is amplified, filtered (by LPF) and AD converted. $V_{mPD,det}(t)$ is then used to calculate the error function using Equ. (9) through detecting the average value of second order harmonic of dither. The error function is further used to calculate the new DC bias current for next loop step using Equ. (10). Then the ABC system is checked if it is converged, if not, then repeat step 3 to step 9. If converged, the system goes to real time tracking status, which is a similar procedure to converging procedure, but the loop control scaling factor may smaller.

Equ. (3) assumes a constant heater resistance of $R_{htr}$, it may also include the dependence of heater resistance on heater current. Then Equ. (4) can be modified accordingly.

In FIG. 1, a 2×2 3 dB coupler is used to combine the two lights of the two arms in the MZM. A 2×1 3 dB coupler may also be used to combine the two lights of the two arms in the MZM. A tap is located in the output optical path to split a small portion of light into a mPD, where most of light was output as output signal light, as show in FIG. 4. Configuration in FIG. 4 may not suffer from phase error away from 180 degree between the signal output port and complementary port as that of FIG. 1. But a tap induces additional insertion loss.

Figure 4:
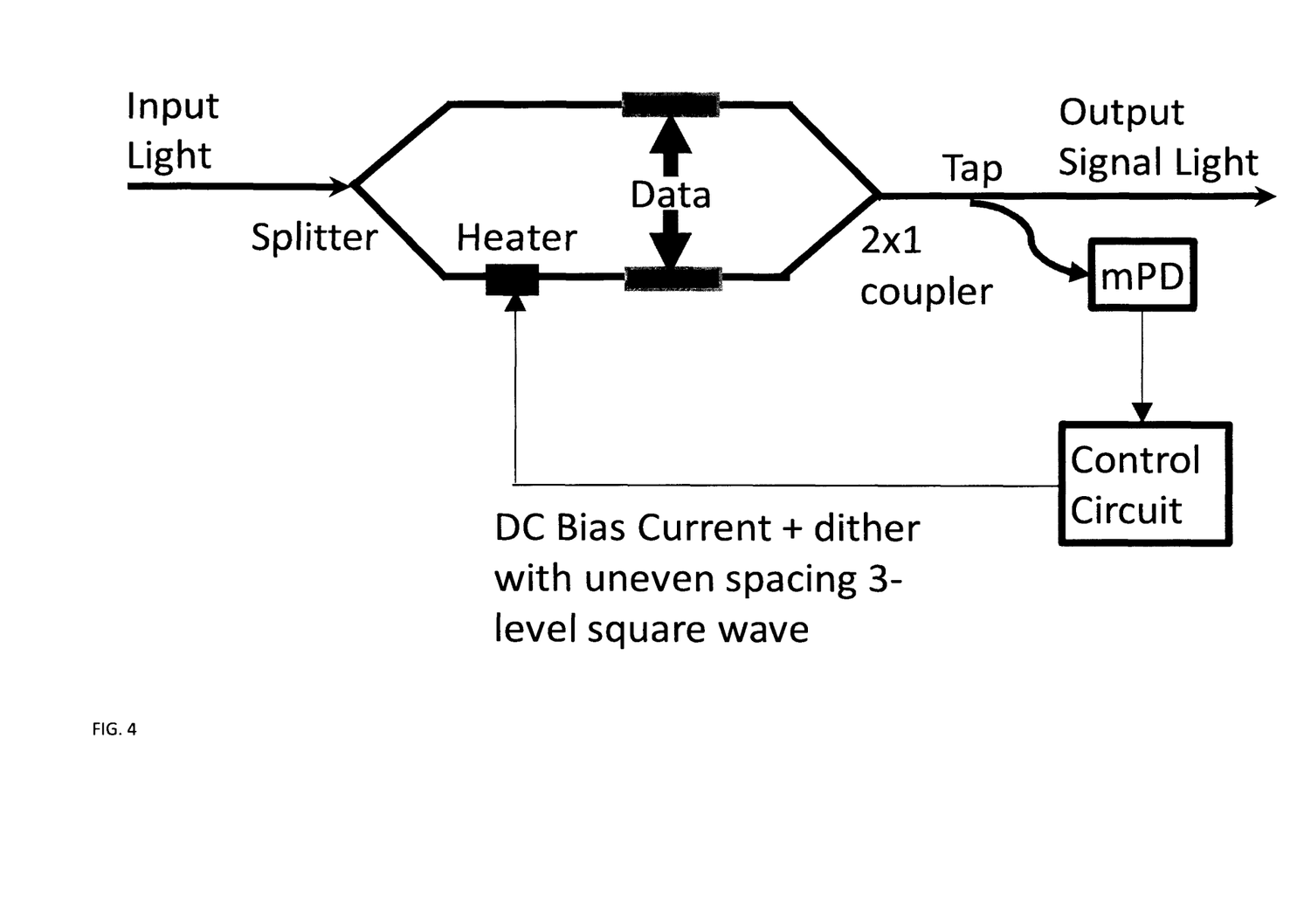
FIG. 4 shows an exemplary embodiment of an ABC for MZM using heater for phase tuning, with a 2×1 coupler and a tap.

FIG. 4 shows an exemplary embodiment of an ABC for MZM using heater for phase tuning, with a 2×1 coupler and a tap. In both FIG. 1 and FIG. 4, the mPD may experience responsivity nonlinearity. An optical attenuator may be added right before the mPD to reduce the power of light input into the mPD. The optical attenuator may a variable optical attenuator consisting of a PN junction. It can also be optical tap which guides only a portion of light into the mPD. The optical attenuator can also be a 1×M optical splitter, where only one output port of splitter is connected to the mPD.

Figure 5:
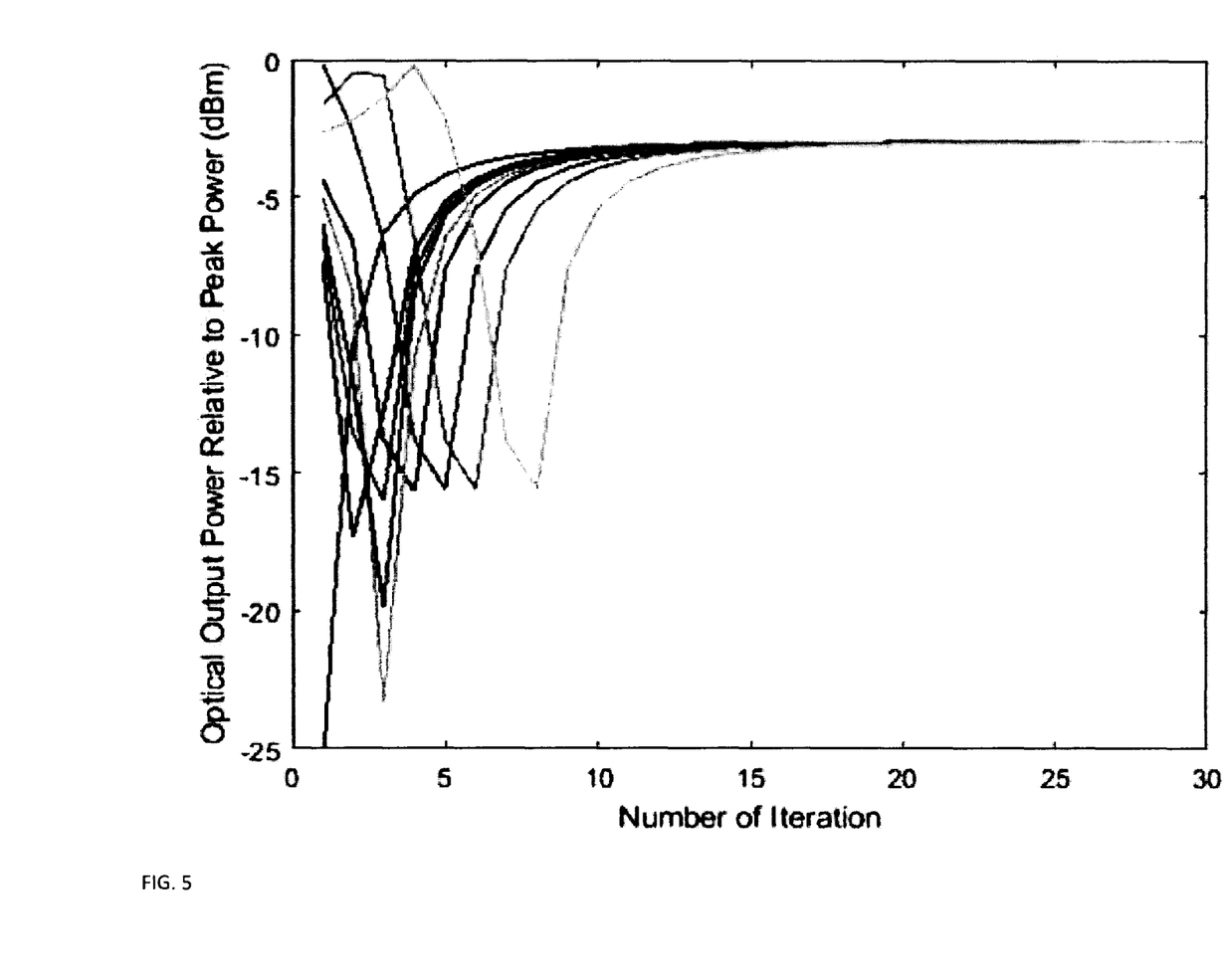
FIG. 5 shows an exemplary graph of MZM optical output power relative to peak output power vs. iteration number for different random initial DC bias currents.
Figure 6:
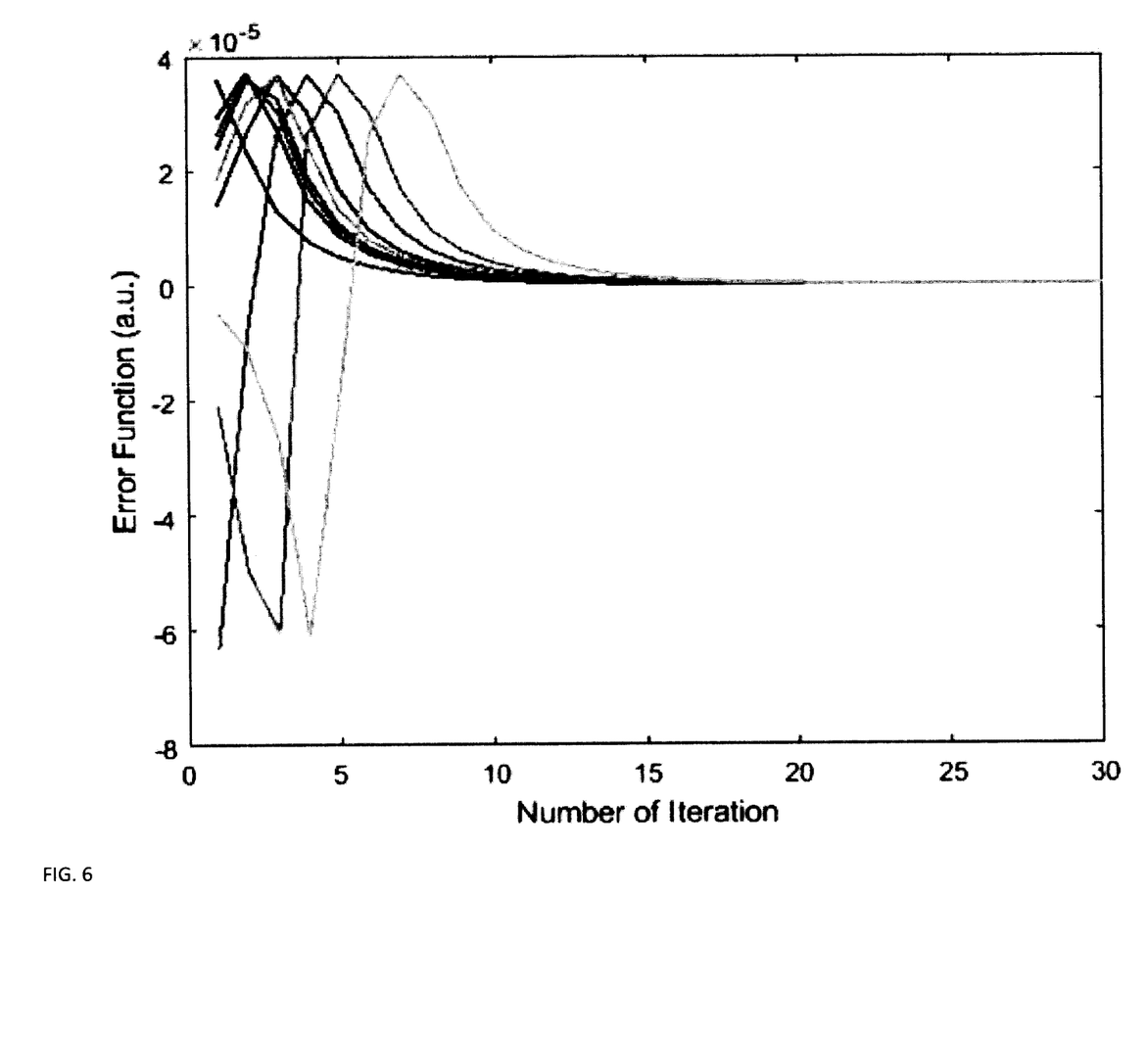
FIG. 6 shows an exemplary graph of an error function vs. iteration number for different random initial DC bias currents.
Figure 7:
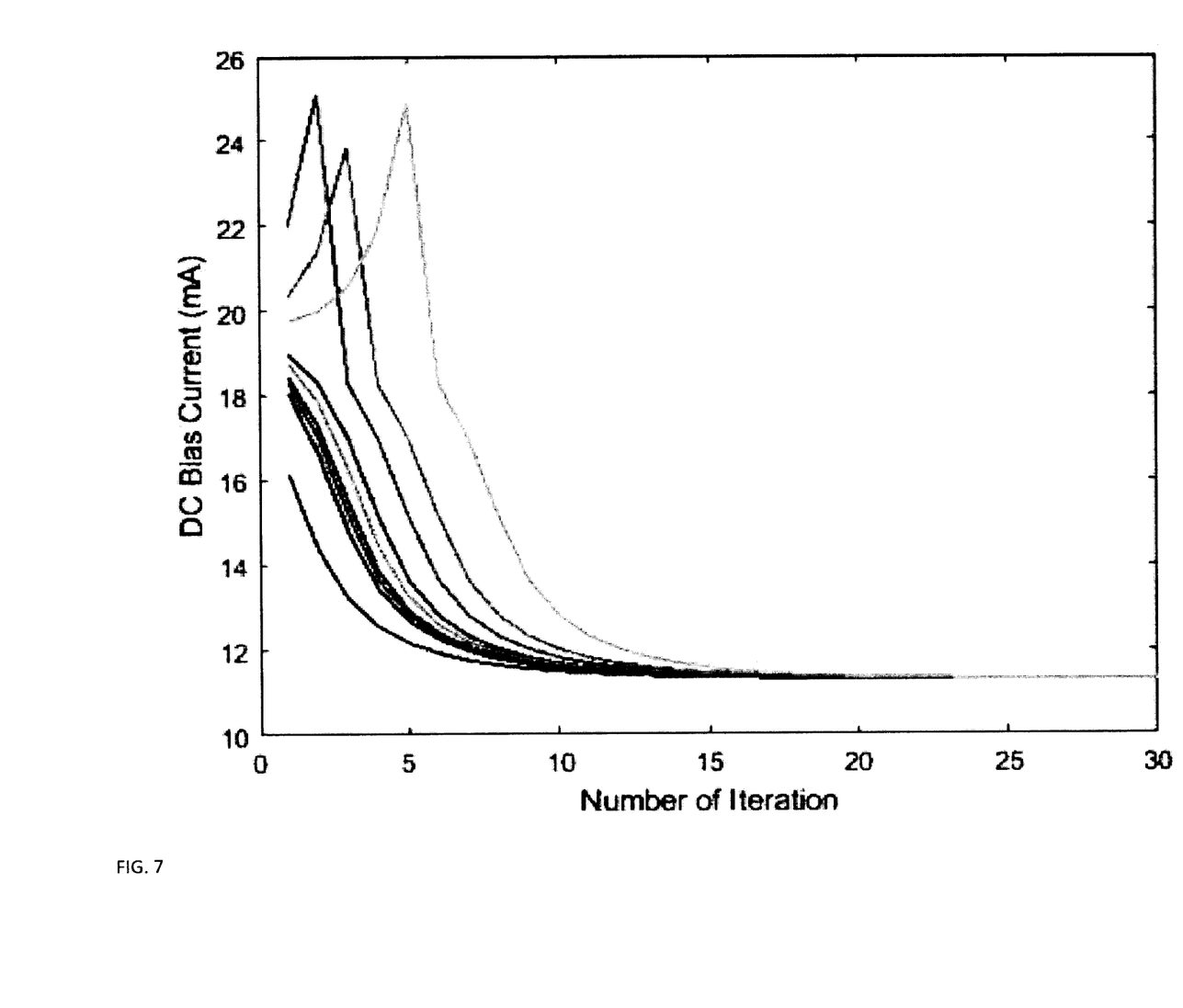
FIG. 7 shows an exemplary graph of a DC bias current vs. iteration number for different random initial DC bias currents.

Simulation was carried out to verify the scheme. A heater with 23 mW $P_\pi$ and 180 Ohm resistance, and a dither with uneven spacing 3-level square waveform, a repetition frequency of 2.5 kHz and a modulation amplitude $I_m$ of 0.25 mA, were used in the simulation. The results of the simulation are shown in FIGS. 5-7. FIG. 5 shows an exemplary graph of MZM optical output power relative to peak output power vs. iteration number for different random initial DC bias currents. FIG. 6 shows an exemplary graph of an error function vs. iteration number for different random initial DC bias currents, and FIG. 7 shows an exemplary graph of a DC bias current vs. iteration number for different random initial DC bias currents.

FIG. 5 shows the MZM optical output power relative to the peak output power as a function of iteration number. 10 simulation cases with different random initial DC bias currents were evaluated. FIG. 5 shows that all the simulation cases converged to the −3 dB point (quad point) of normalized output power. The required number of iterations for convergence depends on the initial DC bias current, dither modulation current as well as the loop control scaling factor, etc. FIG. 6 shows the error function versus iteration number for different random initial DC bias currents. FIG. 6 shows that the error tends to zero after convergence for all the simulation cases with various initial DC bias currents. FIG. 7 shows DC bias current versus iteration number for different random initial DC bias currents. All simulation cases with 10 initial DC bias currents are converged and stabilized to a target DC bias current. It's possible that the converged DC bias current may be another value which corresponds to a new phase shift with $2\pi$ difference. FIGS. 5-7 verify the ABC scheme.

In summary, the system uses an uneven 3-level square wave as dither, combines the dither with the DC bias current to generate total bias current, apply the total bias current to the heater to create a phase shift of MZM, and detect the photocurrent of MZM output, via a single mPD, which is either connected to a tap located in the signal output port or to the complementary port. The photocurrent is converted to digital signal via an analog to digital convertor (ADC); The photocurrent in digital domain is processed to detect the second order harmonic of dither, which is then used to generate the error function and the error function is used generate the new DC bias current. The new DC bias current is updated and again combined with uneven 3 level square wave dither, and is applied to the heater. The whole process repeats for the bias control system to converge and be locked (tracked) to the quadrature point.

One or more embodiments may be a computer program product. The computer program product may include a computer readable storage medium (or media) including computer readable program instructions according to one or more of the embodiments described herein. The computer readable storage medium is a tangible device that can retain and store instructions for use by an instruction execution device. The computer readable storage medium may be, for example, an electronic storage device, a magnetic storage device, an optical storage device, or other suitable storage media. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program instructions, as described herein, can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forward the computer readable program instructions for storage in a computer readable storage medium within the respective computing/processing device.

Computer readable program instructions for carrying out one or more embodiments, as described herein, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a single computer, or partly on the single computer and partly on a remote computer. In some embodiments, the computer readable program instructions may execute entirely on the remote computer. In the latter scenario, the remote computer may be connected to the single computer through any type of network, including a local area network (LAN) or a wide area network (WAN), or public network. One or more embodiments are described herein with reference to a flowchart illustrations and/or block diagrams of methods, systems, and computer program products for enhancing target intercept according to one or more of the embodiments described herein. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. In one or more embodiments, the program instructions of the computer program product are configured as an "App" or application executable on a laptop or handheld computer utilizing a general-purpose or special-purpose operating system.

What is claimed is:

1. A system to provide automatic bias control for intensity modulated modulator, comprising:
a Mach-Zehnder modulator (MZM) to receive a laser light, the MZM including a splitter that splits the laser light into a first arm and a second arm, wherein light in the first arm passes through a first phase section for data modulation and light in the second arm receives heat for bias control and passes through a second phase section for data modulation;
a coupler coupled to the first and second arm, the coupler providing a first output light of the MZM and a complementary output light;
a monitor photodetector (mPD) to receive the complementary output light; and
a control circuit coupled to the mPD to generate a current to heat the second arm based on DC bias current and a dither with an unevenly spaced 3-level square waveform generated as a function of a dither period and an uneven spacing factor.

2. The system of claim 1, comprising a heater to heat the second arm.

3. The system of claim 1, wherein the MZM is based on one of: silicon waveguide, indium phosphide waveguide or a selected waveguide using a heater for phase tuning.

4. The system of claim 1, wherein the control circuit combines the dither with a DC bias current to generate total bias current and applies the total bias current to a heater to create an MZM phase shift.

5. The system of claim 1, wherein the dither output is filtered by a low pass filter (LPF) and digitized with a data converter and represented by $V_{mPD,det}(t)$. $V_{mPD,det}(t)$ and wherein the output is used to construct an error function Err.

6. The system of claim 5, wherein Err is determined by detecting an average value of the second order harmonic of dither as:

$$Err = \frac{1}{NT_b} \int_0^{NT_b} d_I^2(1, t) V_{mPD,det}(t) dt.$$

7. The system of claim 6, wherein the control circuit minimizes Err.

8. The system of claim 1, wherein the coupler comprises a 2×1 coupler.

9. The system of claim 8, wherein the 2×1 coupler combines lights from the two arms, and a tap is used to split light into the mPD, and remaining light becomes an output signal.

10. The system of claim 1, wherein the coupler comprises a 2×2 coupler.

11. The system of claim 10, comprising an optical attenuator introduced between the 2×2 coupler and the mPD.

12. The system of claim 11, wherein the optical attenuator comprises a variable optical attenuator or an optical tap where a portion of light is sent into the mPD.

13. The system of claim 11, comprising a 1×M splitter where one splitter output port is connected to the mPD.

14. A system to provide automatic bias control for intensity modulated modulator, comprising:
a Mach-Zehnder modulator (MZM) to receive a laser light, the MZM including a splitter that splits the laser light into a first arm and a second arm, wherein light in the first arm passes through a first phase section for data modulation and light in the second arm receives heat for bias control and passes through a second phase section for data modulation;
a coupler coupled to the first and second arm, the coupler providing a first output light of the MZM and a complementary output light;
a monitor photodetector (mPD) to receive the complementary output light; and
a control circuit coupled to the mPD to generate a current to heat the second arm based on DC bias current and a dither with an unevenly spaced 3-level square waveform, wherein the uneven 3-level square wave comprises a waveform function $d_I(u, t)$ expressed as:

$$d_I(u, t) = \begin{cases} u & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases}$$

where n is an integer in the range of [0,N−1], $T_b$ is the dither period, and u is the uneven spacing factor.

15. The system of claim 14, wherein the control circuit applies a heater power $d_p$ defined as:

$$d_P(t) = d_I(1, t) = \begin{cases} 1 & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases}$$

16. A method to provide automatic bias control for intensity modulated modulator, comprising:
providing a laser light to a Mach-Zehnder modulator (MZM) and splitting the laser light into a first arm and a second arm, wherein light in the first arm passes through a phase section for data modulation and light in the second arm receives heat for bias control and passes through a second phase section for data modulation;
providing a first output light of the MZM;
providing a complementary output light into a monitor photodetector (mPD); and
applying an uneven spacing 3-level square wave as dither for automatic bias control of MZM which operates at quad point and phase tuning with a heater and wherein the uneven spacing 3-level square wave is generated as a function of a dither period and an uneven spacing factor.

17. The method of claim 16, wherein the control circuit combines the dither with a DC bias current to generate total bias current and applies the total bias current to a heater to create an MZM phase shift.

18. The method of claim 16, wherein the uneven 3-level square wave comprises a waveform function $d_I(u, t)$ expressed as:

$$d_I(u, t) = \begin{cases} u & nT_b < t \leq nT_b + T_b/4 \\ 0 & nT_b + T_b/4 < t \leq nT_b + 2T_b/4 \\ -1 & nT_b + 2T_b/4 < t \leq nT_b + 3T_b/4 \\ 0 & nT_b + 3T_b/4 < t \leq nT_b + 4T_b/4 \end{cases}$$

where n is an integer in the range of [0, N−1], $T_b$ is the dither period, and u is the uneven spacing factor.

19. The method of claim 18, wherein the control circuit applies a heater power $d_P$ defined as:

$$d_P(t) = d_I(1, t) = \begin{cases} 1 & nT_b < t \le nT_b + T_b/4 \\ 0 & nT_b + T_b/4 < t \le nT_b + 2T_b/4 \\ -1 & nT_b + 2T_b/4 < t \le nT_b + 3T_b/4 \\ 0 & nT_b + 3T_b/4 < t \le nT_b + 4T_b/4 \end{cases}$$

20. The method of claim 16, wherein the dither output is filtered by a low pass filter (LPF) and digitized with a data converter and represented by $V_{mPD,det}(t)$. $V_{mPD,det}(t)$ and wherein the output is used to construct an error function Err determined by detecting an average value of the second order harmonic of dither as:

$$Err = \frac{1}{NT_b} \int_0^{NT_b} d_I^2(1, t) V_{mPD,det}(t) dt.$$

* * * * *